(No Model.)  2 Sheets—Sheet 1.
J. W. WETMORE.
STAIRWAY TRUCK.
No. 368,263.  Patented Aug. 16, 1887.
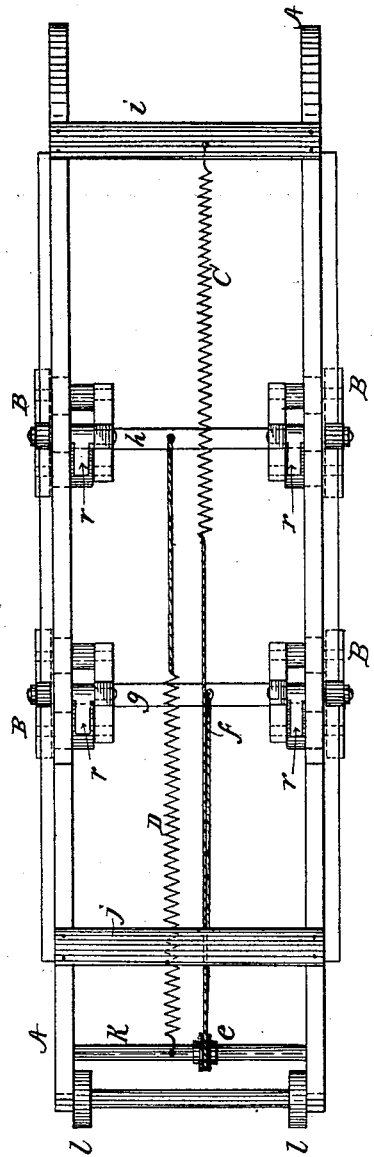
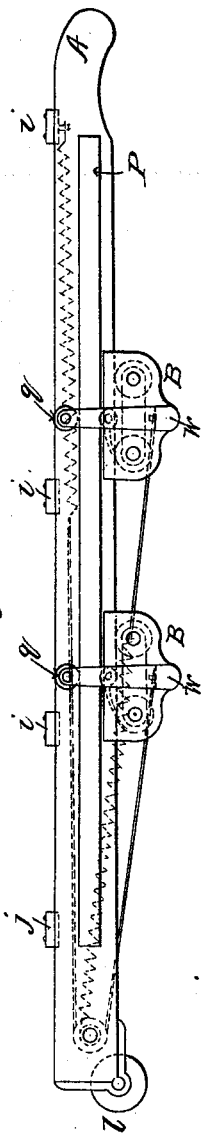
Witnesses.
Walter Scott
W. H. Caugher
Inventor
Jerome W. Wetmore
N. PETERS. Photo-Lithographer, Washington, D. C.

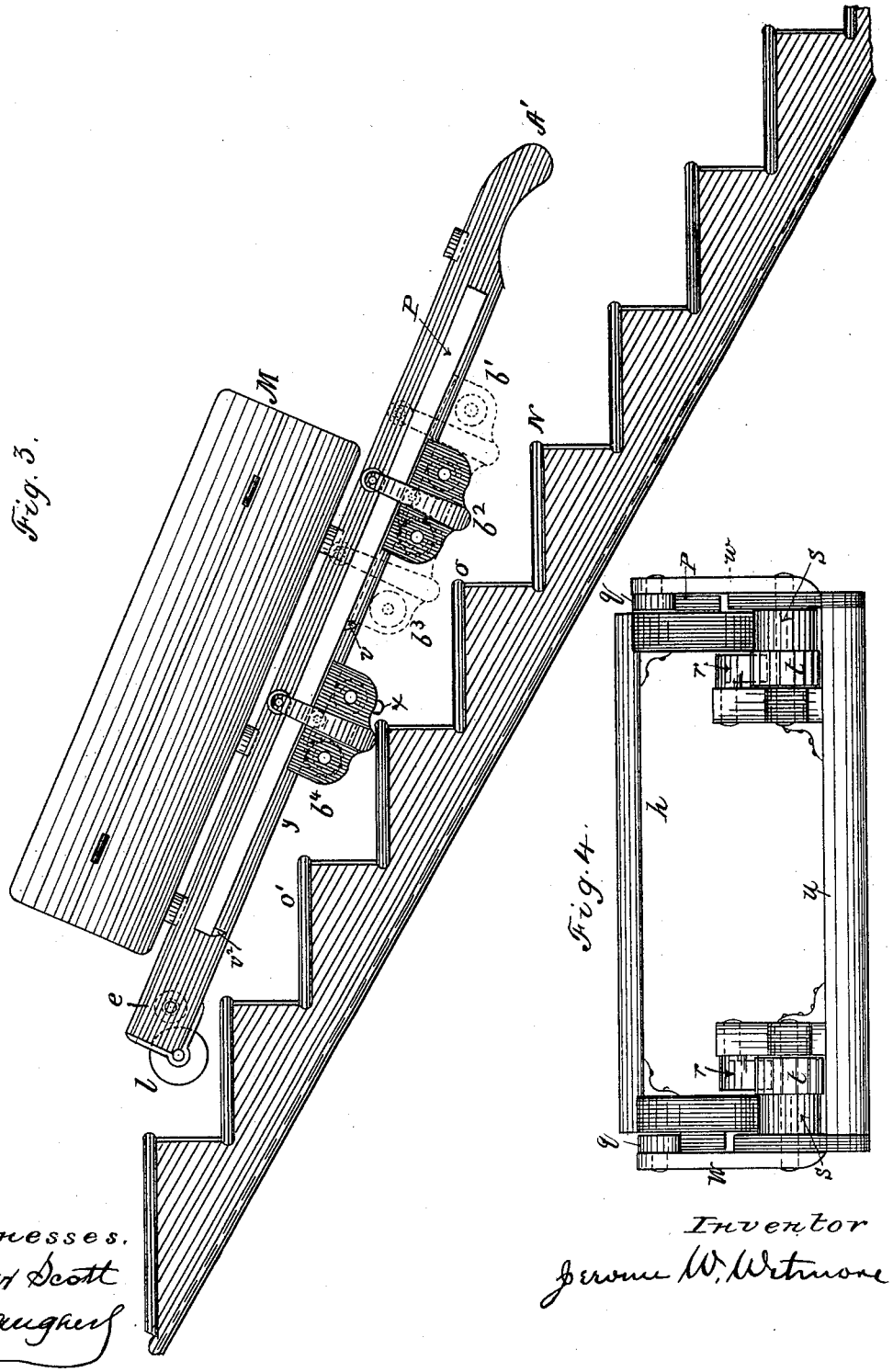

UNITED STATES PATENT OFFICE.

JEROME W. WETMORE, OF ERIE, PENNSYLVANIA.

STAIRWAY-TRUCK.

SPECIFICATION forming part of Letters Patent No. 368,263, dated August 16, 1887.

Application filed January 5, 1887. Serial No. 223,478. (No model.)

*To all whom it may concern:*

Be it known that I, JEROME W. WETMORE, a citizen of the United States, residing at Erie, in the county of Erie and State of Pennsylvania, have invented a new and useful Improvement in Stairway and Heavy-Weight Trucks, of which the following is a specification.

My invention relates to improvements in trucks, the principal frame of which (with the load) is advanced on small wheels in a sub-truck or sub-trucks, which are alternately drawn forward by springs.

The objects of my invention are, first, to produce a low-down stairway-truck for pianos and a truck for other heavy bodies; second, to carry the load upstairs without the action of the wheels on the steps; third, to have the sub-truck step forward carried by hangers suspended on side rails and running on them with slides or friction-rollers; fourth, to secure a truck which will carry its road-bed in one or two short sections with it; fifth, to construct a truck which will carry heavy loads for short distances over roadways which are practically impassable for an ordinary vehicle with such loads. I attain these objects by the mechanism illustrated in the accompanying drawings, in which—

Figure 1 represents a top view. Fig. 2 represents a side view. Fig. 3 represents a side view with a load being taken up a pair of stairs; Fig. 4, an enlarged view of the frame and sub-truck.

A is the frame; B, the sub-trucks; C and D, the springs by which B and B are drawn forward; $e$, friction-wheel; $f$, the cord connecting the cross-tie $g$ with the spring C over the friction-wheel $e$; $g$ and $h$, upper bracketed cross-ties of the sub-trucks; $u$, lower cross-ties of the same, the foot of the sub-truck; $i$ and $j$, bracketed cross-beams of the frame; $k$, bar to which spring D and spring-roller $e$ are attached; $l\,l$, ordinary truck-wheels; M, the load; N, $o$, and $p$, stairway-steps; P, carriage-way attached to the outside of the frame A, on which the wheels $q$ run when the sub-truck is drawn forward; $r$, pawl operating when the truck is going upstairs on the ratchet-wheel $t$, Fig. 4, to prevent the frame and its load from rolling back on the wheels $s$, which are the main bearing-wheels on which the frame and its load are moved forward; $v$ and $v$, Fig. 3, movable stops on both sides of the frame, by which the advance of the sub-truck is adjusted to differences in the rise and tread of stairs; $w$, Fig. 2, hangers connecting wheels $q$ with the sub-trucks; $x$, point and line of the foot of the sub-truck, where a strong molding may be attached to press against the nose of the step and serve as a check.

The friction-wheel $e$ is introduced so as to give the spring C greater length.

There are two ratchet-wheels and pawls, $r$, on each sub-truck—one for each set of wheels.

The ordinary truck-wheel, $l$, is used in running light and in turning on a platform on a winding stairs.

The cords may be branched to make double connections with the ties $g$ and $h$.

The operation of the truck is as follows. (Illustrated in Fig. 3.) When $b^4$ first rested on the step the other truck was at $b'$ resting on step N, and the frame and load were drawn or pushed forward on them. Then, as soon as the lower end of the truck was raised the sub-truck began to be moved forward by its spring D, as is seen at $b^2$, and will continue to be advanced to the position $b^3$, where it is checked by its stop $v$. The rear end of the truck is then lowered until the sub-truck $b^3$ rests on step $o$. The forward end of the truck is then raised and the truck $b^4$ advances until checked by its stop $v^2$, already set at the proper distance to give this sub-truck a proper foothold on step $o'$. Then the frame and load are drawn and shoved forward on both sub-trucks. The sub-trucks are then alternately advanced as before.

A single sub-truck may be used instead of two. Wheels $l$ would then sustain the forward end of the weight while the sub-truck would be advancing; or a movable cross-block attached to the under side of the frame near the point $y$, Fig. 3, may be used instead of the forward truck or wheels, $l\,l$. If $l\,l$ be thus used, they would need a ratchet-wheel.

Draft-ropes may be attached to the forward end of the truck, and lifting-levers operated on it for safety and assistance.

Posts and braces will be constructed in the usual form on the frame, to sustain the load.

What I claim is—

1. The stairway and heavy-weight truck, composed of the truck-frame, and sub-truck suspended by hangers and carried forward by traction-springs to the movable stops, substantially as and for the purpose set forth.

2. The stairway and heavy-weight truck, constructed of the frame A, sub-truck B, the hangers w, the small wheels q, the railway P, and the traction-springs C and D, substantially as and for the purpose described.

3. In the stairway and heavy-weight truck, the sub-truck, in combination with the hangers and their friction-wheels and bearing-wheels and railway, the traction-springs and the truck-frame, substantially as described, for the purpose set forth.

4. The combination, in a stairway and heavy-weight truck, with the truck-frame, of the sub-truck, (its hanger-carrying and weight-bearing wheels and grooved foot,) the sub-truck railway, and the traction-springs, substantially as and for the purpose set forth.

JEROME W. WETMORE.

Witnesses:
WM. P. HAYES,
WALTER SCOTT.